US011802587B2

United States Patent
Adleff et al.

(10) Patent No.: US 11,802,587 B2
(45) Date of Patent: Oct. 31, 2023

(54) BEARING FOR A MEDICAL OR COSMETIC INSTRUMENT

(71) Applicant: MINEBEA MITSUMI INC., Nagano (JP)

(72) Inventors: Kurt Adleff, Crailsheim (DE); Erich Greiter, Weitnau (DE); Martin Rauh, Weler-Simmerberg (DE); Martin Engler, Leutkirch (DE)

(73) Assignee: MINEBEA MITSUMI INC.

( * ) Notice: Subject to any disclaimer, the term of this patent is extended or adjusted under 35 U.S.C. 154(b) by 29 days.

(21) Appl. No.: 17/579,228

(22) Filed: Jan. 19, 2022

(65) Prior Publication Data

US 2022/0228625 A1 Jul. 21, 2022

(30) Foreign Application Priority Data

Jan. 20, 2021 (DE) .......................... 102021200484.9
Jan. 13, 2022 (DE) .......................... 102022200272.5

(51) Int. Cl.
*F16C 33/78* (2006.01)
*F16C 33/80* (2006.01)
*F16C 19/06* (2006.01)
*F16C 33/58* (2006.01)

(52) U.S. Cl.
CPC ............ *F16C 19/06* (2013.01); *F16C 33/583* (2013.01); *F16C 33/7806* (2013.01); *F16C 2316/13* (2013.01)

(58) Field of Classification Search
CPC ...... F16C 19/06; F16C 33/583; F16C 33/585; F16C 33/7806; F16C 33/7886; F16C 33/80; F16C 2316/13
See application file for complete search history.

(56) References Cited

FOREIGN PATENT DOCUMENTS

| DE | 102018200303 A1 | * | 7/2019 | |
|----|----|----|----|----|
| JP | 2004011827 A | * | 1/2004 | .......... F16C 33/7889 |
| JP | 2012193858 A | * | 10/2012 | .............. F16C 19/30 |
| JP | 2015086994 A | * | 5/2015 | .............. A61C 1/05 |
| KR | 20160089593 A | * | 7/2016 | |

* cited by examiner

*Primary Examiner* — Phillip A Johnson
(74) *Attorney, Agent, or Firm* — Faegre Drinker Biddle & Reath LLP

(57) ABSTRACT

The disclosure relates to a rolling bearing for a medical or cosmetic instrument including a bearing inner ring revolving around an axis of rotation; and a stationary bearing outer ring, which concentrically encloses the bearing inner ring; wherein a bearing gap is formed between the bearing inner ring and the bearing outer ring and a plurality of rolling bodies is arranged in succession in circumferentially in the bearing gap, the bearing inner ring being mounted in the bearing outer ring; and wherein the rolling bodies are arranged rolling on the bearing inner ring and the bearing outer ring, the bearing gap being covered in the axial direction by a cover disk, which forms a radial gap with the bearing inner ring extending in the axial direction, the radial gap has a gap length and a gap height, the gap length being at least 25% of the rolling body height.

23 Claims, 11 Drawing Sheets

Detail X

BEARING FOR A MEDICAL OR COSMETIC INSTRUMENT

CROSS-REFERENCE TO RELATED APPLICATIONS

The present application claims priority to and the benefit of German Patent Application No. DE102021200484.9, filed Jan. 20, 2021 and German Patent Application No. DE102022200272.5, filed Jan. 13, 2022, the entire disclosures of which are hereby expressly incorporated herein by reference.

BACKGROUND/SUMMARY

The present disclosure relates to a rolling bearing for a medical or cosmetic instrument, in particular a handheld instrument, and a medical or cosmetic instrument, in particular a handheld instrument, for example a dental handheld instrument, having such a rolling bearing.

The risk generally exists in rolling bearings that dirt particles penetrating between the bearing outer ring and the bearing inner ring, in particular in the region of the raceways of the rolling bodies, result in premature wear, which reduces the service life of the rolling bearing. In addition, the risk exists in rolling bearings in medical or cosmetic instruments that upon a required disinfection of the instrument using a more or less aggressive disinfectant, grease or lubricant is flushed out of the rolling bearing, which also results in increased wear and a reduced service life of the rolling bearing. It is therefore typical at least in the handheld instruments to seal the bearing gap between bearing inner ring and bearing outer ring to minimize the introduction of foreign materials or undesired media.

In rolling bearings in medical instruments, inter cilia, dental handheld instruments, for example, linear or angled handpieces, as the present disclosure especially relates to, it may be desired at the same time that in certain applications bodily fluids such as blood or saliva flow through the instrument and are then suitably disposed of. A particle deposit in the bearings, particularly in the case of blocking of the driveshaft and a resulting standstill of the bearing as a result of which pressure differences break down in the region of the bearing, also has to be avoided here. Furthermore, the statements also made above with respect to the penetration of disinfectants apply here. In such instruments, it is therefore advantageous if a seal is provided which seals off the bearing gap in the case of stationary rolling bearing, i.e. the rolling bearing or the shaft mounted in the rolling bearing is not revolving, and more or less releases the bearing gap in the case of revolving rolling bearing or revolving shaft, respectively.

EP 0 689 801 A2 accordingly discloses a bearing seal having linear seal disks or angled labyrinth rings on the bearing outer ring and bearing inner ring, which substantially seal off the bearing gap by forming a labyrinth seal, for a medical or dental treatment instrument having drive. Seal disks or seal rings, which are fastened alternately in the bearing outer ring and bearing inner ring, can be used to provide the labyrinth seal. Furthermore, a throwing ring can be provided on the shaft which carries the tool, which is mounted upstream of the seal on the engagement side of bodily fluids such as blood or saliva.

DE 10 2012 000 757 A1 discloses an elastically deformable seal plate for sealing the bearing gap between bearing outer ring and the bearing inner ring. The seal disk, which is held fixed in place in the bearing outer ring, is lifted off of a counter surface by a pressure difference in the case of rotating bearing inner ring and presses against the counter surface in the case of stationary bearing ring because the pressure difference disappears. The above-described functionality of the contacting seal at a standstill and the non-contacting seal in the operating state having revolving shaft is thus achieved.

EP 0 497 139 B1 proposes, to achieve the same functionality, providing in the handpiece head around the tool shaft an elastic disk, which presses against the tool shaft all around in the idle state and seals it to the outside, and which lifts off of the tool shaft under the effect of an overpressure forming in the handpiece head in operation enough that contact no longer takes place. When the drive air is switched off and as a result the overpressure collapses in the handpiece head, the elastic disk presses against the still rotating tool shaft again and thus brakes it, while at the same time the penetration of contaminants along the tool shaft is prevented as a result of the vacuum forming in the housing.

DE 10 2018 200 303 A1 proposes for a generic bearing a seal disk made of an elastic material, which is fastened on the revolving bearing ring in order to be deformed more and less by centrifugal force and thus seal off the gap at a standstill and release it in operation. The seal disk can delimit the seal gap jointly with a counter surface, which is formed by a counter element installed on the stationary bearing ring DE 10 2019 200 371 A1 proposes for such a bearing a seal disk having a base which is positioned between the bearing housing and the bearing outer ring and exerts a damping function. The seal disk can form a seal gap frontally on the bearing inner ring or radially outside on the bearing inner ring.

DE 10 2018 201 621 A1 proposes fora generic bearing a lifting seal disk which presses against a stop face in the lifted state.

DE 10 2018 212 721 A1 proposes a displaceable seal disk for a generic bearing.

DE 10 2005 012 277 A1 discloses a bearing arrangement having a hollow-cylindrical or cylindrical body and a ring-like seal element.

JP 2004-19 722 A discloses a rolling bearing having a seal lip which forms a type of labyrinth seal with the bearing ring.

In the mentioned generic rolling bearings, a seal is thus provided which releases an overpressure-related airflow to the surroundings in operation of the rolling bearing. When this escaping pressurized airflow encounters liquids or surfaces wetted with liquids during the use of the instrument having the bearing, aerosols can thus be generated in this way which escape into the surrounding space. If these aerosols are infectious, the risk exists of infecting persons located in the surrounding space. The liquids can thus be, for example, saliva in the oral cavity of a patient, who can be infected with viruses, wherein the viruses can also be present in the saliva, so that the viruses are distributed with the aerosols in the air in the surrounding space. Moreover, the escaping pressurized airflow can result in the occurrence of emphysema.

The present disclosure is therefore based on the object of improving a rolling bearing for a medical or cosmetic instrument, in particular a handheld instrument, in such a way that this risk of infection or the risk of an occurrence of emphysema is reduced. Existing rolling bearings are preferably to be able to be refitted easily using the solution according to the disclosure.

The object according to the disclosure is achieved by a rolling bearing having the features of claim 1. The dependent claims describe advantageous and particularly expedient embodiments of the disclosure. Furthermore, a medical or cosmetic instrument having such a rolling bearing and a method for installing a cover disk in such a rolling bearing are specified.

A rolling bearing according to the disclosure for a medical or cosmetic instrument has a bearing inner ring revolving around an axis of rotation and a stationary bearing outer ring, which concentrically encloses the bearing inner ring. A bearing gap is formed between the bearing inner ring and the bearing outer ring in the radial direction of the axis of rotation and a plurality of rolling bodies is arranged in succession in the circumferential direction in the bearing gap, via which rolling bodies the bearing inner ring is mounted in the bearing outer ring.

The rolling bodies are arranged rolling on the bearing inner ring and the bearing outer ring and have a rolling body height in the radial direction. If the rolling bodies are balls, the rolling body height thus corresponds to the ball outer diameter.

The bearing gap is covered according to the disclosure in the axial direction by a cover disk fastened on the bearing outer ring or integrally formed with the bearing outer ring, which cover disk, together with the bearing inner ring, forms a radial gap extending in the axial direction with a gap length, which has a gap height in the radial direction. Alternatively, the cover disk can also be fastened on a housing which accommodates the bearing outer ring, or is formed integrally therewith. The fastening is then generally arranged in the immediate vicinity of the axial end of the bearing outer ring.

According to the disclosure, the gap length is at least 25% of the rolling body height, preferably at least 50% of the rolling body height.

Due to the dimensioning of the gap length relative to the rolling body height, a reduction of the airflow escaping from the rolling bearing interior can be achieved in medical or cosmetic instruments using the cover disk, which substantially minimizes the infection risk by aerosol formation or the risk of an occurrence of emphysema described at the outset and is usable for different rolling bearing types having different rolling body heights. The inventors have thus recognized that the rolling body height, which can be, for example, between only 0.5 and 3 mm, in particular between 0.8 and 1.2 mm, for example 1 mm, has a significant effect on the air throughput through the rolling bearing and the air throughput increases with greater rolling body height, so that according to the disclosure a greater gap length is accordingly provided to reduce the air throughput.

The radial gap is preferably freely continuous in relation to the surroundings, i.e., it is not closed by a further seal element or a further seal disk, in particular at the outlet side, neither in the stationary nor in the revolving state of the bearing inner ring.

Preferably, no further seal element or cover element is opposite to the radial gap in the axial direction on the axial side facing away from the rolling bodies.

The maximum extension of the gap height is preferably at most 20% of the rolling body height, in relation to the radius of the rolling bearing. The minimum extension of the gap height is preferably greater than an operating clearance between the bearing inner ring and the bearing outer ring at operating temperature of the rolling bearing, wherein the operating clearance is composed of the clearance between the bearing inner ring and the rolling bodies and the clearance between the rolling bodies and the bearing outer ring. On the one hand, an undesired contact between the cover disk and the bearing inner ring is avoided and, on the other hand, the passage of air at the rolling bearing on the side of the cover disk is effectively minimized by this minimum gap height.

It is advantageous if the gap length of the radial gap between the cover disk and the bearing inner ring is limited to twice or three times the bearing body height. Lengths exceeding this have proven to be structurally complex and less effective in comparison to shorter gap lengths. Rather, long gap lengths require a greater radial gap to prevent rubbing, which is counterproductive.

The cover disk is particularly preferably fastened on the end face on the bearing outer ring. The fastening can be, for example, a materially bonded fastening, in particular by welding, adhesive bonding, or vulcanizing. However, a formfitting or friction-locked connection also comes into consideration.

According to one particular embodiment of the disclosure, the cover disk encloses the bearing outer ring on its radial outer side at one axial end and is fastened on a radial outer surface of the bearing outer ring, in particular in an edge-open or edge-closed radial recess of the bearing outer ring. The fastening can again be materially bonded or friction-locked (frictional) and/or formfitting. For example, fastening by means of welding, adhesive bonding, press fit, clipping or mechanical snapping in (by elastic form fit) or by means of a recess on the bearing outer ring and clamping with a snap ring come into consideration.

According to one embodiment of the disclosure, the cover disk, viewed in an axial section through the axis of rotation, is L-shaped on both sides of the axis of rotation having a radial leg arranged on the bearing outer ring and an axial leg forming the radial gap. A structurally particularly compact solution which can be easily refitted in an existing bearing or in an existing bearing environment can thus be achieved. The axial leg preferably extends exclusively in the direction of the rolling bodies, thus in the direction of the bearing interior, starting from the radial leg.

According to an alternative embodiment, the cover disk, viewed in the axial section through the axis of rotation, is T-shaped on both sides of the axis of rotation, having a radial leg arranged on the bearing outer ring and an axial leg forming the radial gap. The axial leg thus extends starting from the radial leg in both axial directions and can be arranged partially inside and partially outside the space between the bearing inner ring and the bearing outer ring. In principle, a complete arrangement inside the corresponding space also comes into consideration.

A particularly large gap length can be achieved particularly easily using the T-shaped solution, without the risk that the axial leg will bend or break in an undesired manner due to an excessively large free length.

With a T-shaped design of the cover disk, according to one embodiment, the section of the axial leg extending in the direction of the rolling bodies, thus in the direction of the bearing interior, starting from the radial leg, can be longer than the section of the axial leg which extends starting from the radial leg in the direction toward the surroundings, i.e., away from the rolling bodies.

According to one preferred embodiment of the disclosure, the cover disk, viewed in an axial section around the axis of rotation, comprises a radial leg extending in the radial direction and arranged on the bearing outer ring and an axial leg extending in steps in the axial direction and forming the radial gap in steps. The axial leg accordingly extends with two sections on different diameters. The axial legs preferably have a first axial section which forms a section of the radial gap together with a shaft mounted in the bearing inner ring and a second axial section which forms a section of the radial gap together with the bearing inner ring, wherein the two sections of the radial gap are offset in relation to one another in the radial direction, thus are arranged on different diameters. A particularly effective seal can thus be achieved.

To achieve a blocking air curtain in the radial gap, according to one embodiment of the disclosure, at least one bore extending in the radial direction or diagonally to the axial direction can be provided in the cover disk, which opens inside the gap length in the radial gap. Air from the bearing gap can thus enter the radial gap through the at least one bore and form the desired blocking air curtain. A plurality of corresponding bores is preferably provided, which are arranged in succession in the circumferential direction, at regular or irregular intervals, in particular with identical intervals in relation to one another.

If, according to one particularly preferred embodiment of the disclosure, a gap length of at least 50% of the rolling body height is provided, a very effective reduction of the air escape can then be achieved, with easy structural implement ability still provided. Furthermore, refitting of existing rolling bearings is thus easily possible.

According to one embodiment of the disclosure, the gap height varies over the gap length. In the direction of the medium flow through the bearing, the gap cross section preferably increases, viewed starting from the side of the rolling bodies. In particular, the gap height increases over the gap length in the flow direction (direction away from the rolling bodies), in particular linearly viewed in an axial section through the axis of rotation. For example, the height of the radial gap becomes increasingly smaller in the direction of the bearing interior, that is to say in the direction of the rolling bodies.

According to one embodiment, the cover disk is elastically deformable in the axial direction at least in the region of its end assigned to the bearing inner ring. At a standstill of the rolling bearing, in which no pressure difference exists over the cover disk, a stronger seal can thus be achieved than during operation of the rolling bearing.

The cover disk preferably presses against a step or end face of the bearing inner ring at a standstill of the rolling bearing and is raised off of the step or the end face when the bearing inner ring revolves due to a differential pressure applied to the cover disk.

To generate an even better sealing effect, the cover disk and/or the bearing inner ring can have a conveyance contour adjoining the radial gap, which effectuates air conveyance of air located in the radial gap in the direction of the bearing interior, that is to say in the direction of the rolling bodies. For example, this conveyance contour comprises channels, notches, and/or projections in the surface of the cover disk and/or the bearing inner ring adjoining the radial gap. In particular, a spiral-shaped groove or a spiral-shaped projection comes into consideration. However, other groove shapes are also possible, for example, individual circumferential grooves arranged adjacent to one another in the axial direction (direction of the axis of rotation), which can extend in an axial section, for example, perpendicularly or diagonally to the axis of rotation.

In particular if a step is provided in the radial gap in the rolling bearing according to the disclosure, the radial gap thus extends starting from a first diameter radially outward to a second diameter, a conveyance contour can thus also be formed in the step at the surface of the cover disk and/or the counter surface of the bearing ring, which conveys air radially outward back into the rolling bearing interior.

According to one embodiment of the disclosure, the cover disk is inserted radially inside into the bearing outer ring. This avoids a force flow which results, for example, in the case of an axial angulation of the rolling bearing, if the rolling bearing is designed as a separable ball bearing or as an angular ball bearing, via the cover disk in a housing accommodating the bearing outer ring. A corresponding force flow is particularly prevented by a weld seam if the cover disk is welded to the bearing outer ring.

According to one advantageous embodiment, the bearing outer ring has an edge-open radial groove radially inside, that is to say on its surface oriented radially inward, into which the cover disk is inserted. The cover disk can thus be centered particularly favorably in the bearing outer ring, for example, before it is welded to the bearing outer ring. In particular, no additional centering tool is necessary.

According to one advantageous embodiment of the disclosure, an additional cover disk is provided on the axial side of the rolling bearing facing away from the cover disk, which forms a second radial gap, that is to say delimits it, with the bearing inner ring. Such an additional cover disk in particular reduces an airflow into the rolling bearing. This cover disk can also be installed on the bearing outer ring or formed integrally with it. In particular, the cover disk is welded on the bearing outer ring.

If the rolling bearing is embodied as a single-row ball bearing in the form of a separable ball bearing or angular ball bearing, a shoulder is thus preferably provided in the bearing outer ring on the axial side of the cover disk and a shoulder is provided in the bearing inner ring on the axial side facing away from the cover disk. An axial angulation of the bearing having a force flow diagonal, starting from the axial side of the bearing inner ring facing away from the cover disk in the direction of the axial side of the bearing outer ring, can thus be achieved using the cover disk.

A medical or cosmetic instrument according to the present disclosure comprises a revolving shaft for accommodating a tool or having a tool, and a bearing as described. The medical instrument is embodied, for example, as a dental handheld instrument, wherein a dental tool is mounted or mountable on the shaft.

To be able to set the gap dimensions according to the disclosure as exactly as possible, a method for installing a cover disk in a rolling bearing according to the present disclosure provides that the cover disk is placed on the bearing inner ring using a spacer in the radial gap and is thus centered in relation to the bearing inner ring. The cover disk can subsequently be fixed in the centered state on the bearing outer ring or the housing, and then the spacer is only removed from the radial gap in the fixed state.

For example, a film having predetermined thickness can be used as the spacer, which is introduced into the radial gap. In particular, the film is first applied to the bearing inner ring in the region which later delimits the radial gap. The cover disk can subsequently be pushed over the film and thus centered. Finally, the cover disk can then be fixed on the bearing outer ring or the housing and the film can be removed.

The cover disk particularly preferably has a design which enables easy refitting of the existing rolling bearings without the cover disk colliding with existing bearing components. Alternatively, the existing bearing components can be adapted in their geometry. For example, a recess, which is in particular edge-open, can be introduced on a bearing inner ring at the axial end, in which the cover disk plunges. In other embodiments, the installation space provided in any case between the bearing outer ring and the bearing inner ring is used to introduce the cover disk, for example, if the rolling bearing has a so-called snap cage.

The disclosure is usable with various rolling bearing types. Separable ball bearings and deep groove ball bearings are only mentioned as examples.

For example, corrosion-resistant steel (in particular 1.4301 or 1.4305) is suitable as the material for the cover disk. Other advantageous materials are a sterilization-resistant polymer such as PEEK or PTFE.

The cover disk, which is advantageously provided in a medical or cosmetic instrument on the axial bearing outer side of the bearing, which is close to the tool or the toolholder, can be the only cover disk of the rolling bearing. According to another embodiment, a cover disk is also provided on the side of the rolling bearing facing away, which can be disk-shaped or can also have the shape described here. Other shapes are possible.

The cover disk, which is provided according to another embodiment in a medical or cosmetic instrument on the axial bearing inner side of the bearing, which is close to the tool or the toolholder, can be the only cover disk of the rolling bearing. The cover disk thus delimits the air entry into the bearing and thus indirectly the air exit out of the bearing. According to another embodiment, a cover disk is also provided on the side of the rolling bearing facing away, which can be disk-shaped or can also have the shape shown here. Other shapes are possible.

The disclosure is to be described by way of example hereinafter on the basis of exemplary embodiments and the figures.

DETAILED DESCRIPTION

Figure 1:
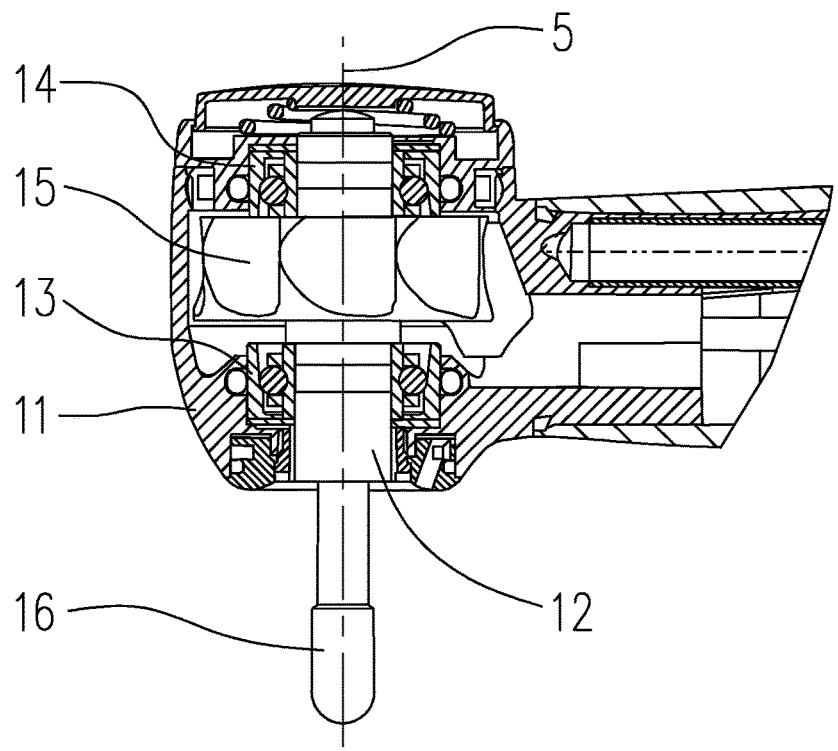
FIG. 1 shows an exemplary illustration of a dental handheld instrument (dental handpiece), in which at least one rolling bearing according to the disclosure can be provided.
Figure 2:
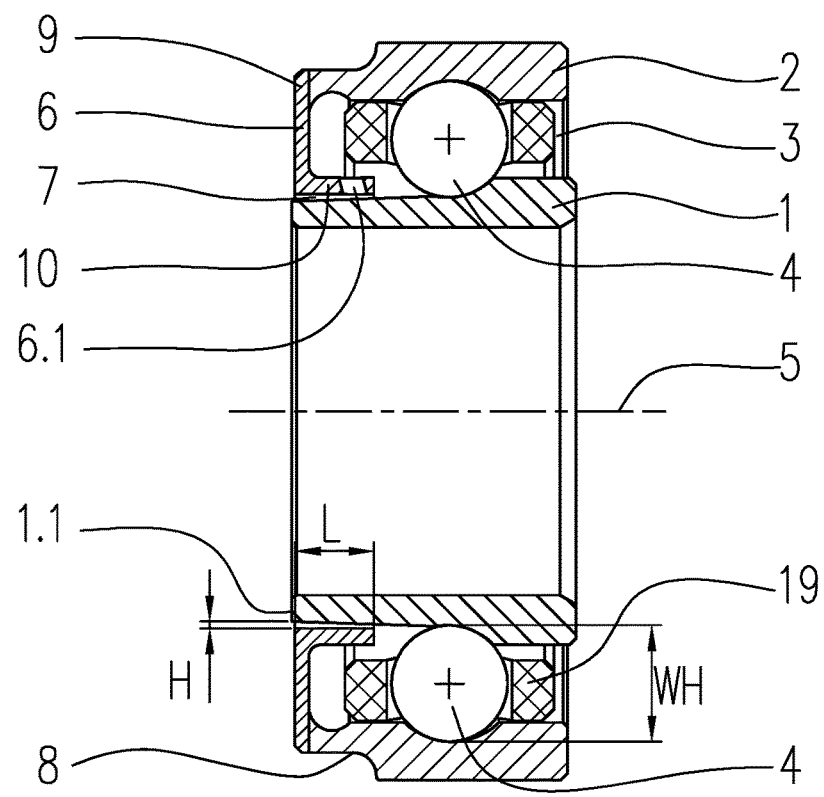
FIG. 2 shows an exemplary embodiment of a rolling bearing according to the disclosure.

A dental handheld instrument is illustrated by way of example in FIG. 1 in a sectional illustration, which only shows the front part of a housing 11, also called head housing, in which a shaft 12 is mounted rotatably around the axis of rotation 5 by means of the rolling bearings 13, 14. A rotor 15 in the form of a turbine wheel, which is driven by means of compressed air, is fastened on the shaft 12. A tool 16 can be fastened at the axial end of the shaft 12. The rolling bearing 13 arranged on the tool side can preferably be provided with the cover disk according to the disclosure.

Various exemplary embodiments of a rolling bearing according to the disclosure, for example, the rolling bearing 13 in FIG. 1, are shown in FIGS. 2 to 21. The rolling bearings each preferably have a cover disk 6 on the side facing toward the tool 16 in FIG. 1, which is provided with an axial leg 10, which adjoins a radial leg 9. In principle, the cover disk 6 could also be provided on the side of the rolling bearing 13 facing away from the tool 16, in order to reduce an air entry into the rolling bearing 13.

The radial leg 9 is fastened on the bearing outer ring 2 of the rolling bearing, the axial leg 10 is opposite in the radial direction to a radial outer surface of at least the bearing inner ring 1 in such a way that the bearing inner ring 1 forms a radial gap 7 jointly with the cover disk 6, which has a gap length L in the axial direction, and a gap height H in the radial direction.

The cover disk 6 covers a bearing gap 3 between the bearing inner ring 4 and the bearing outer ring 2 in the axial direction. Rolling bodies 4 of the rolling bearing are mounted in the bearing gap 3, wherein the rolling bodies 4 roll on a radial inner surface of the bearing outer ring 2 and a radial outer surface of the bearing inner ring 1, so that the bearing inner ring 1 revolving around the axis of rotation 5 is mounted by the rolling bodies 4 in the stationary bearing outer ring 2.

The rolling bodies 4 have a rolling body height WH in the radial direction, which can be, for example, only 1 mm in the dental handheld instrument shown in FIG. 1.

According to the disclosure, the gap length L is at least 25% of the rolling body height WH.

In the exemplary embodiments shown here, the gap length L is preferably at least 50% of the rolling body height WH, in particular 70% or more.

The minimum extension of the gap height H is preferably greater than an operating clearance between the bearing inner ring 1 and the bearing outer ring 2, viewed with interconnected rolling bodies 4, so that the operating clearance, which is measured at operating temperature of the rolling bearing, results from the mobility of the bearing inner ring 1 in relation to the rolling bodies 4 and of the rolling bodies 4 in relation to the bearing outer ring 2, in particular in the radial direction.

The maximum extension of the gap height H is advantageously at most 20% of the rolling body height WH.

The bearing gap 3, as is apparent from FIGS. 2 to 22, preferably opens freely into the surroundings in the axial direction. This means that no additional cover disk, cover element, or seal disk is provided which partially or completely overlaps the bearing gap 3 in the axial direction In FIGS. 2 to 5, the cover disk, viewed in an axial section through the axis of rotation 5, is L-shaped, in relation to one half of the axial section on each side of the axis of rotation 5. The axial leg 10 accordingly extends completely on only one axial side of the radial leg 9.

A bore 6.1 can be provided in the axial leg 10, which effectuates a blocking air curtain in the radial gap 7, because compressed air can flow out of the bearing gap 3 radially inward through the bore 6.1 into the radial gap 7. The bore 6.1 can extend obliquely to the axial direction or radial direction or perpendicularly to the axis of rotation 5. A plurality of corresponding bores 6.1 are preferably arranged in succession in the circumferential direction around the axis of rotation 5.

Figure 6:
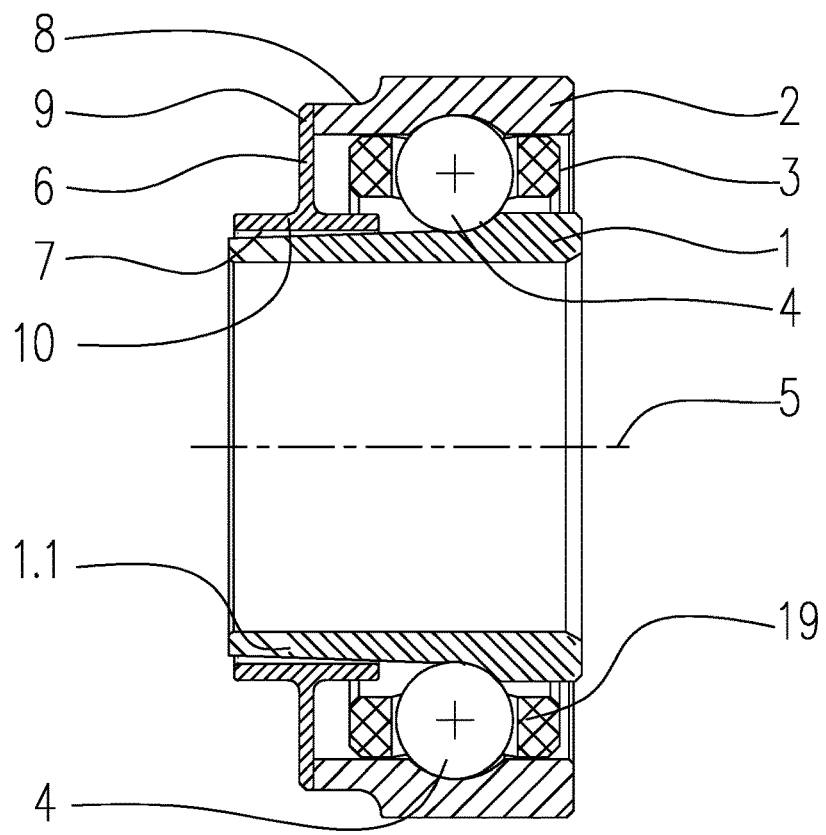
FIG. 6 shows a further exemplary embodiment of a rolling bearing according to the disclosure.

In the embodiment according to FIG. 6, the cover disk 6, viewed in axial section through the axis of rotation 5, is formed T-shaped on both sides of the axis of rotation 5, wherein the radial leg 9 again extends in the radial direction and the axial leg 10 again extends in the axial direction. The axial leg 10 extends here on both sides in the axial direction in relation to the radial leg 9, however.

If the axial leg 10, as shown in FIGS. 2 to 6, extends exclusively in the axial direction, i.e., parallel to the axis of rotation 5 in the axial section shown through the axis of rotation 5, the radial gap 7 can thus be embodied having diverging height H if the radial outer surface of the bearing inner ring 1 preferably tapers in the direction of its axial end. Alternatively, however, a radial gap 7 having constant gap height H over the gap length L can be provided, by corresponding mutually opposing parallel surfaces of the cover disk 6 and the bearing inner ring 1, wherein the surfaces can be arranged in the axial section shown in parallel to the axis of rotation 5 or diagonally to the axis of rotation 5.

Figure 3:
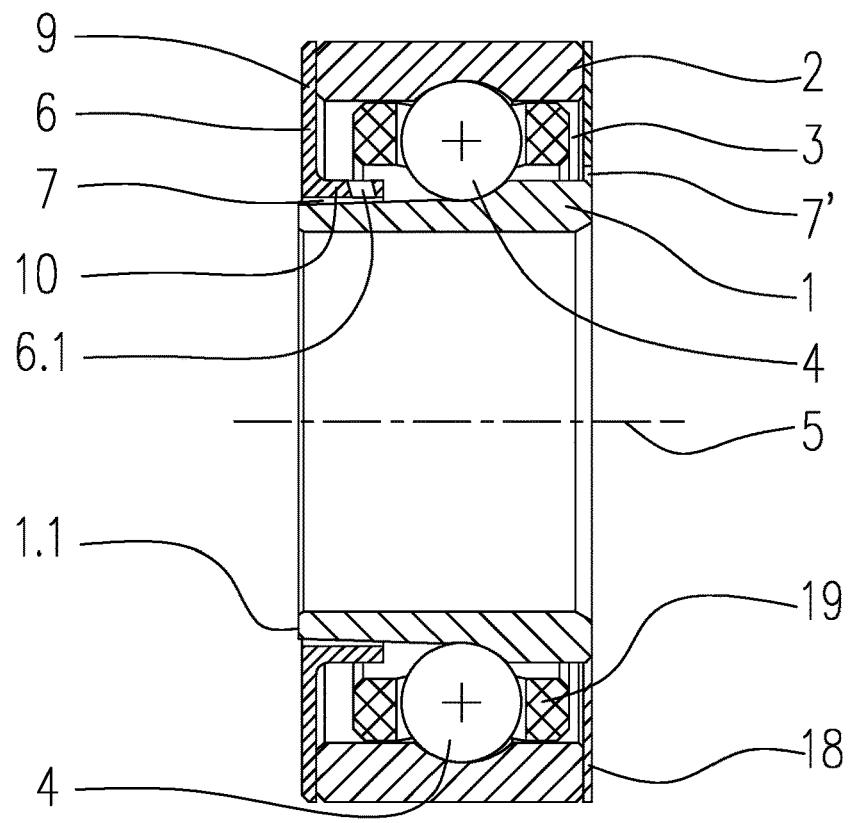
FIG. 3 shows a further exemplary embodiment of a rolling bearing according to the disclosure.
Figure 4:
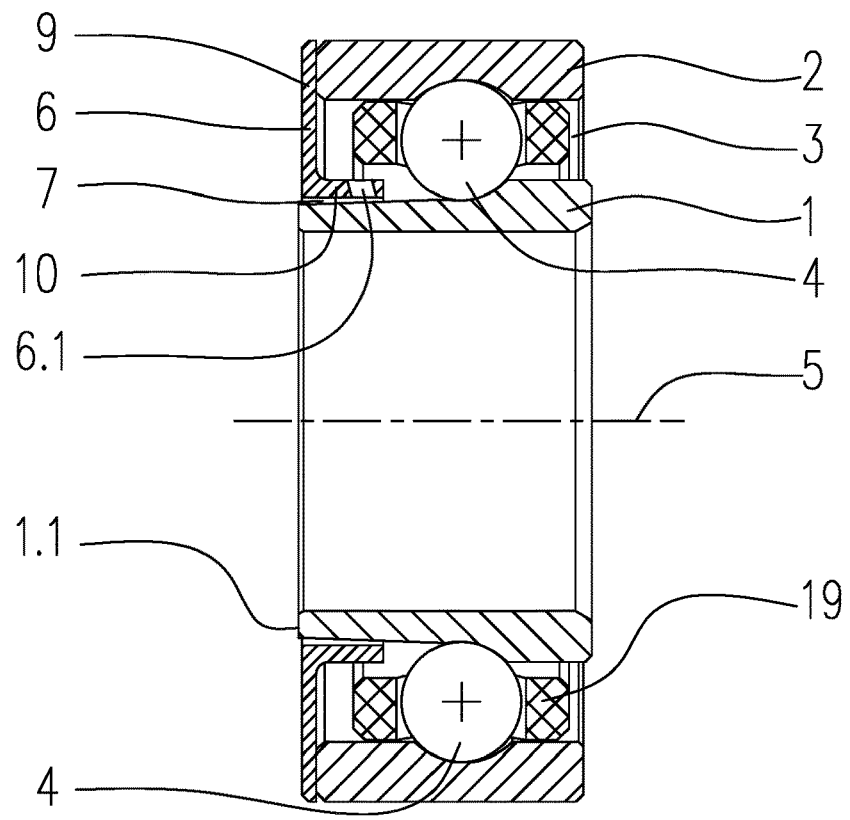
FIG. 4 shows a further exemplary embodiment of a rolling bearing according to the disclosure.
Figure 5:
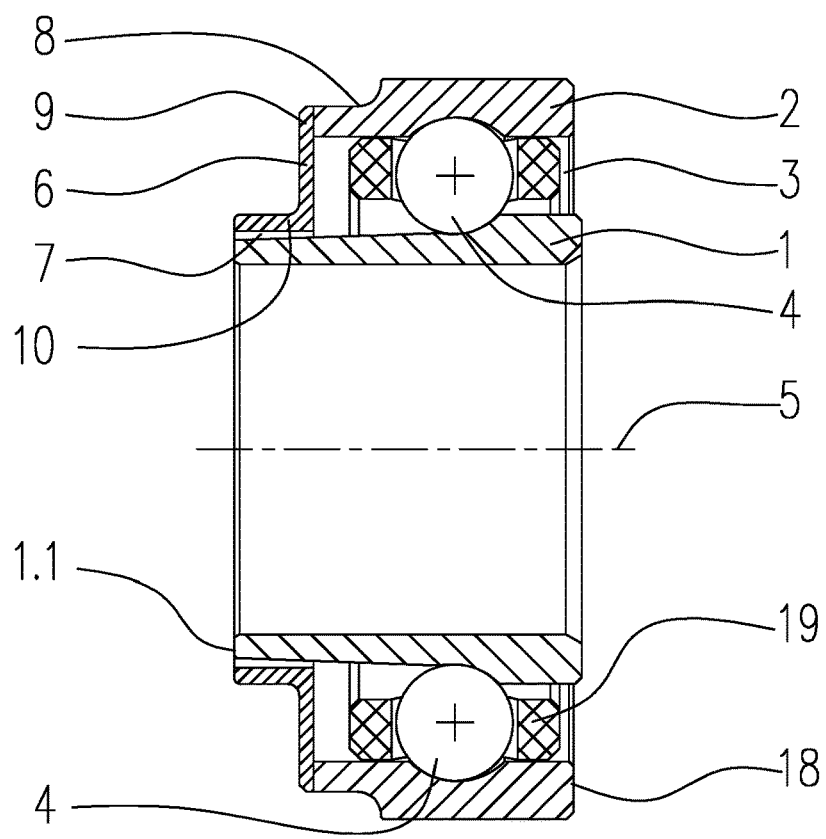
FIG. 5 shows a further exemplary embodiment of a rolling bearing according to the disclosure.

In the embodiment according to FIG. 3, it is furthermore shown that an additional cover disk 18 can be provided on the side of the rolling bearing facing away from the cover disk 6, which reduces an airflow into the rolling bearing. This cover disk 18 can also be installed on the bearing outer ring 2 or formed integrally therewith and can form a second radial gap 7' with the bearing inner ring 1. Alternatively, the additional cover disk 18 is attached to the bearing inner ring 1 or formed integrally (in one piece) therewith and thus conveys air radially outward due to its rotation, so that this air does not enter or enters to a lesser extent into the bearing gap 3.

Figure 7:
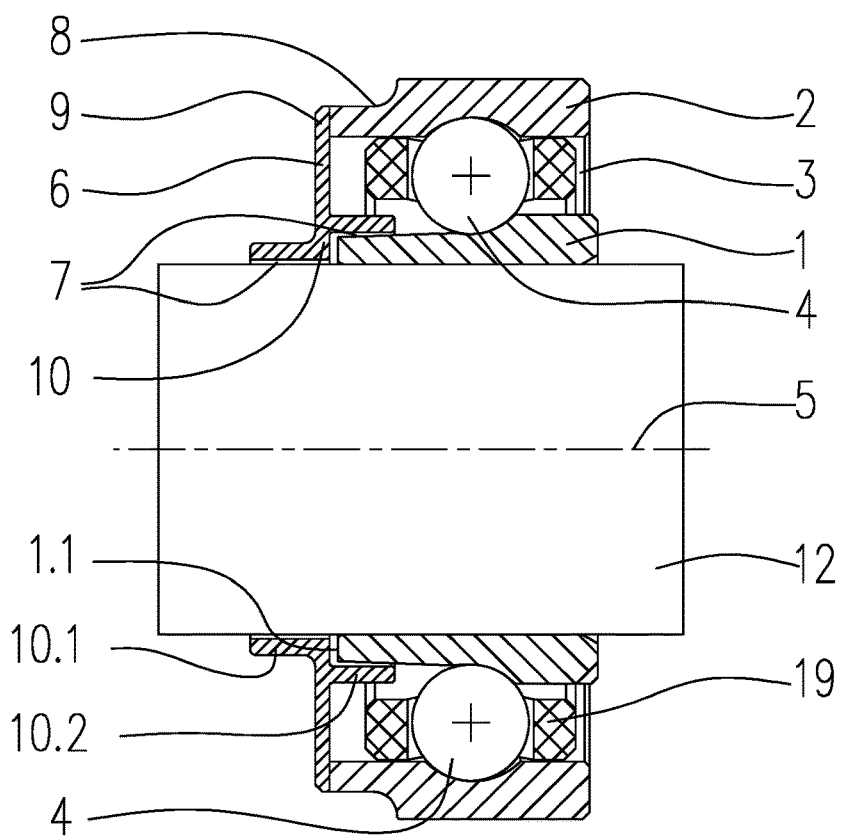
FIG. 7 shows a further exemplary embodiment of a rolling bearing according to the disclosure.
Figure 8:
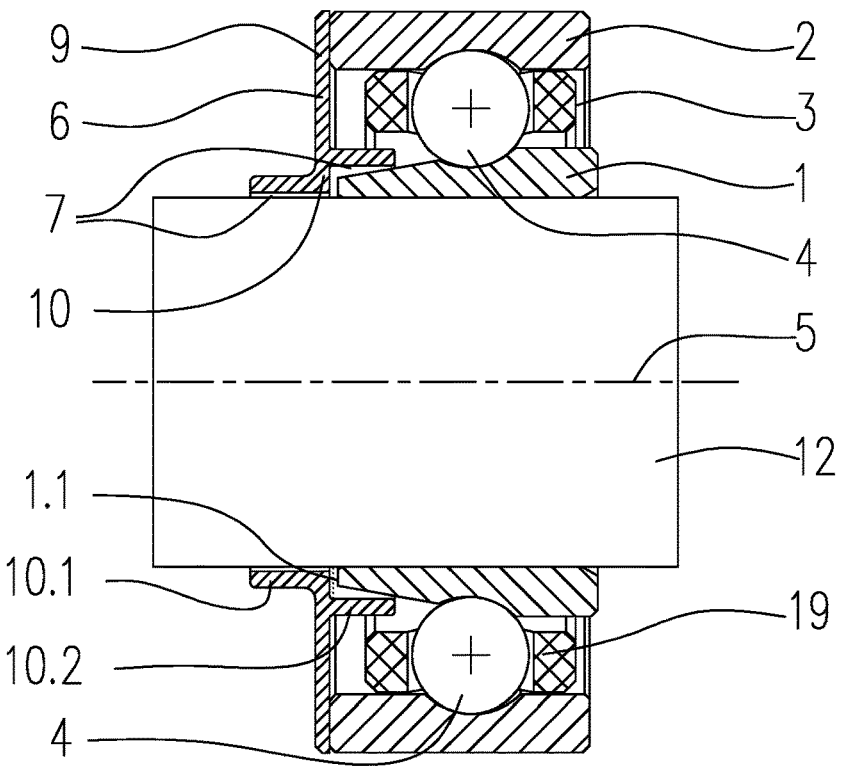
FIG. 8 shows a further exemplary embodiment of a rolling bearing according to the disclosure.

In the embodiments according to FIGS. 7 and 8, the cover disk 6 has, in addition to the radial leg 9, an axial leg 10 having two axial sections 10.1 and 10.2 on different diameters to form a stepped radial gap 7. The first axial section 10.1 forms an axial section of the radial gap 7 together with the radial outer surface of the shaft 12. The first axial section 10.1 is attached for this purpose to the radial leg 9 on the side facing away from the bearing gap 3 or the rolling bodies 4. The second axial section 10.2 adjoins the radial leg 9 on the side facing toward the rolling bodies 4 and forms a section of the radial gap 7 with the radial outer surface of the bearing inner ring 1. The two sections of the radial gap 7 are connected to one another by a radial section of the radial gap 7. The radial section is formed by the end face 1.1 of the bearing inner ring 1 and an opposing surface of the cover disk 6, for example of the radial leg 9. The flow of compressed air through the radial gap 7 is reduced once again by this step.

The embodiment according to FIG. 8 substantially corresponds to that of FIG. 7. However, the axial end section of the bearing inner ring 1, which is opposite to the second axial section 10.2 of the axial leg 10, is inclined comparatively more strongly in relation to the bearing axis 5, so that the radial gap 7 is reduced comparatively more strongly over its course into the bearing interior, i.e., in the direction of the rolling bodies 4.

Figure 9:
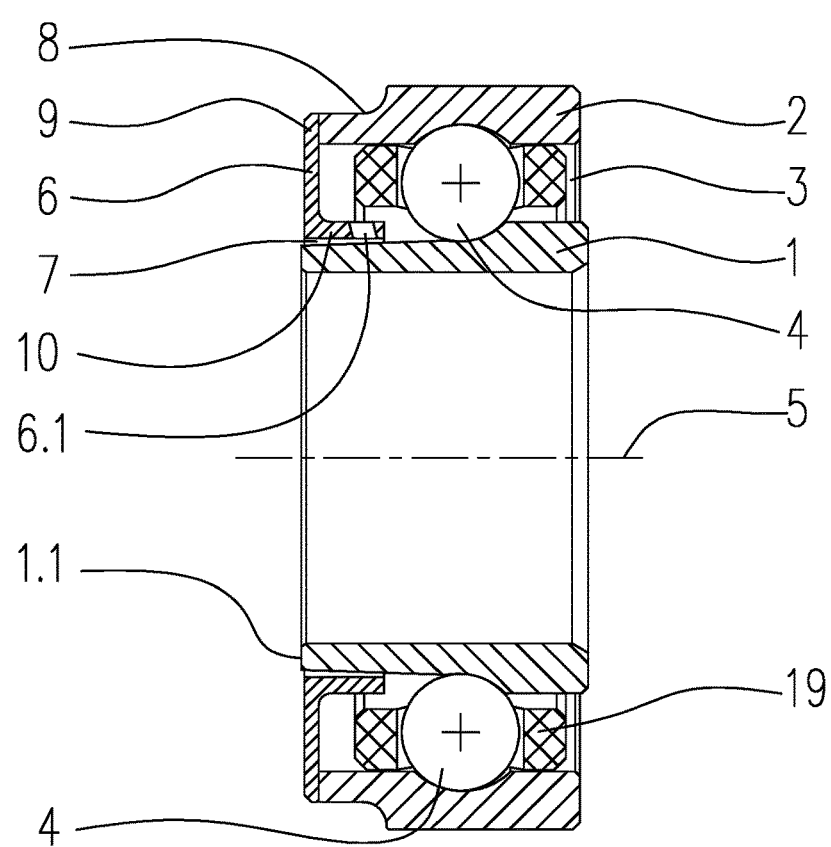
FIG. 9 shows a further exemplary embodiment of a rolling bearing according to the disclosure.

The embodiment according to FIG. 9 shows, like the other embodiments also shown here, a radial recess 8 at one axial end of the bearing outer ring 2. A seal element and/or damping element, for example, in the form of a rubber ring, advantageously an O-ring, can advantageously be accommodated therein to support the bearing outer ring 2 against a housing. In spite of this radial recess 8, the cover disk 6 is fastened frontally on the bearing outer ring 2 and does not enclose the bearing outer ring 2.

In the embodiments according to FIGS. 2 to 9 and 19 to 21, the rolling bodies 4 are only guided on one side on the bearing inner ring 1 in the axial direction, but the bearing outer ring 2 encloses the rolling bodies 4 on both sides in the axial direction. This is reversed in the design according to FIG. 10. It is thus preferably a separable ball bearing in each case. To achieve an axial angulation of the ball bearing having a force flow in the diagonal direction through the rolling bodies 4, the ball bearing could also be embodied as an angular ball bearing, i.e., the rolling bodies 4 would also accordingly only be guided on one side on the bearing outer ring 2 in the axial direction, specifically on the axial side facing away from the guide on the bearing inner ring 1.

Figure 10:
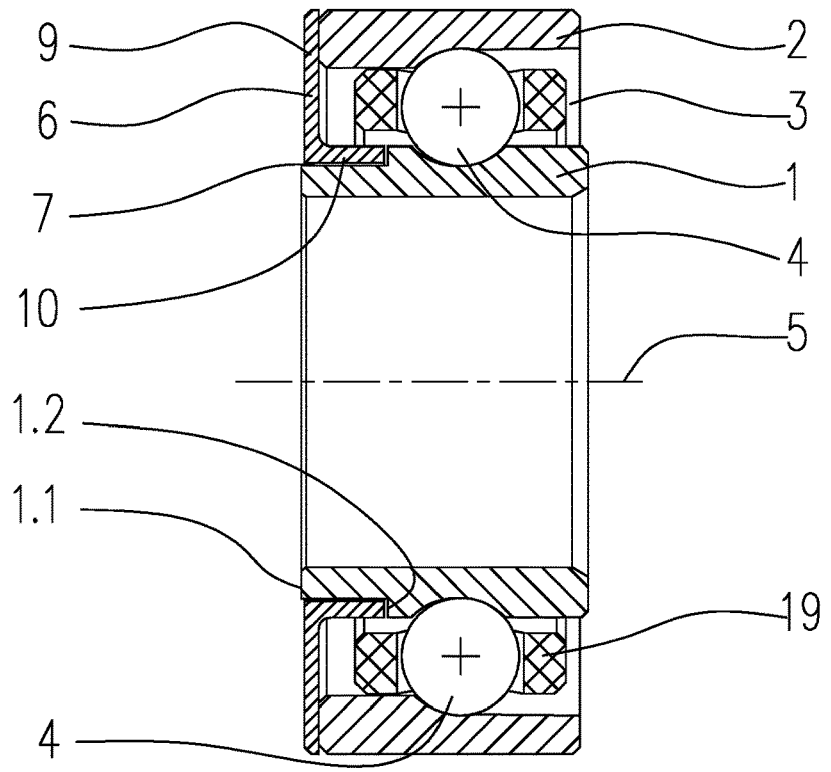
FIG. 10 shows a further exemplary embodiment of a rolling bearing according to the disclosure.

Furthermore, in the design according to FIG. 10, the bearing inner ring 1 forms a step 1.2, so that the radial gap 7 has a section extending in the radial direction, which is not formed here by the end face 1.1 of the bearing inner ring 1, however. A further step could be provided on the end face 1.1. According to one exemplary embodiment, a corresponding axial gap always remains between the axial end of the step 1.2 and the cover disk 6. According to another exemplary embodiment, the cover disk 6 is elastically deformable, so that in the idle state of the bearing, the cover disk 6 abuts the step 1.2.

Figure 11:
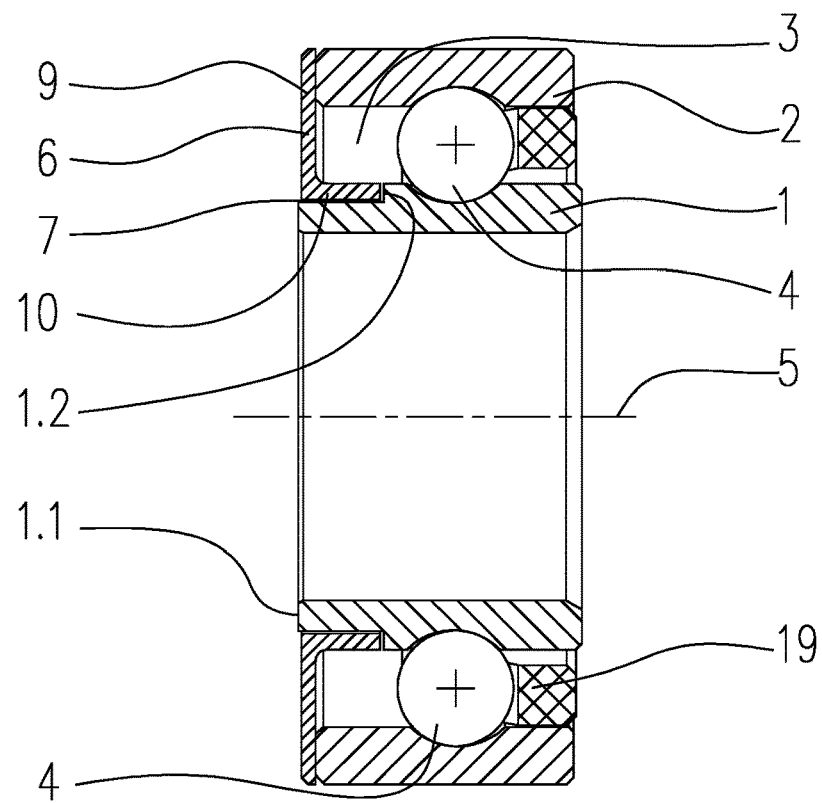
FIG. 11 shows a further exemplary embodiment of a rolling bearing according to the disclosure.

The embodiment according to FIG. 11 substantially corresponds to that of FIG. 10, except that here the rolling bodies 4 are enclosed on both sides in the axial direction by the bearing inner ring 1 and by the bearing outer ring 2. It is thus preferably a deep groove ball bearing. The design of the cage 19 in which the rolling bodies 4 are held also differs from the preceding embodiments. The cage 19 is thus embodied as a crown cage and only encloses the rolling bodies 4 on one axial side, in contrast to the preceding embodiments, in which the rolling bodies 4 are held on both sides in the cage 19 in the axial direction. However, these details are not necessarily required.

Figure 12:
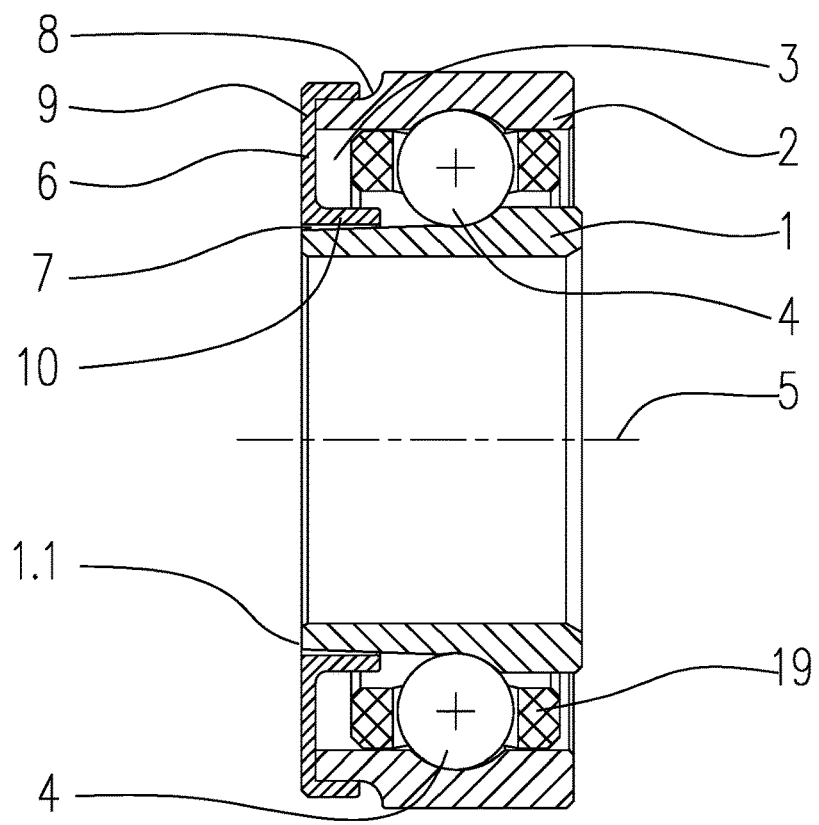
FIG. 12 shows a further exemplary embodiment of a rolling bearing according to the disclosure.

According to FIG. 12, the cover disk 6 encloses the bearing outer ring 2 at one axial end and extends into the radial recess 8. The cover disk 6 is, for example, pressed radially outside onto the bearing outer ring 2 here.

Figure 13:
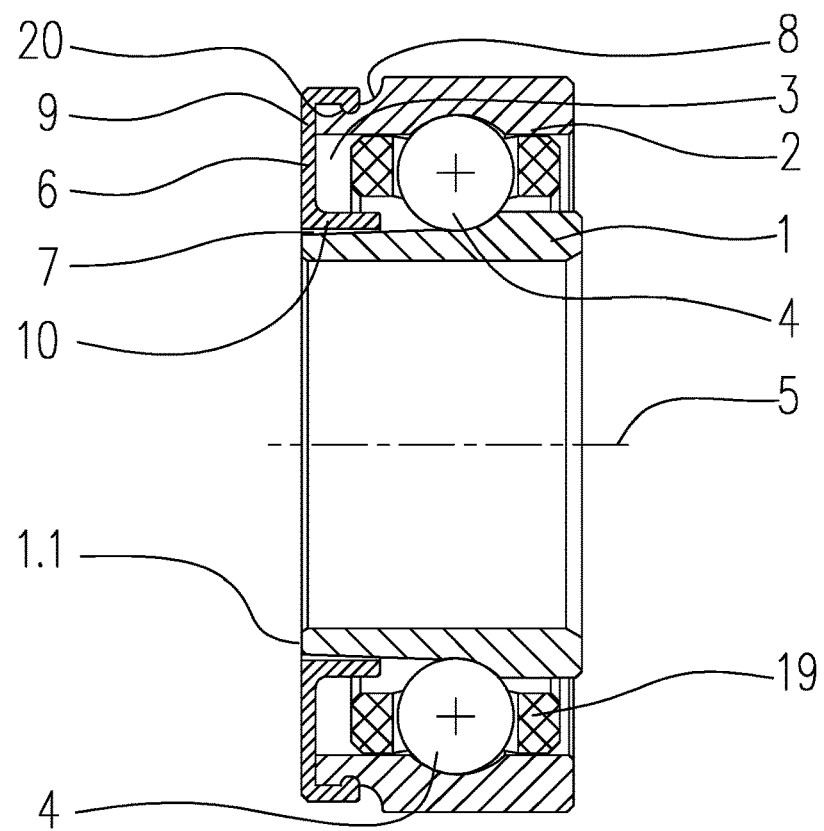
FIG. 13 shows a further exemplary embodiment of a rolling bearing according to the disclosure.

In the embodiment according to FIG. 13, a circumferential groove 20 is provided inside the radial recess 8, in which the cover disk 6 engages in a formfitting manner from the radial outside.

Figure 14:
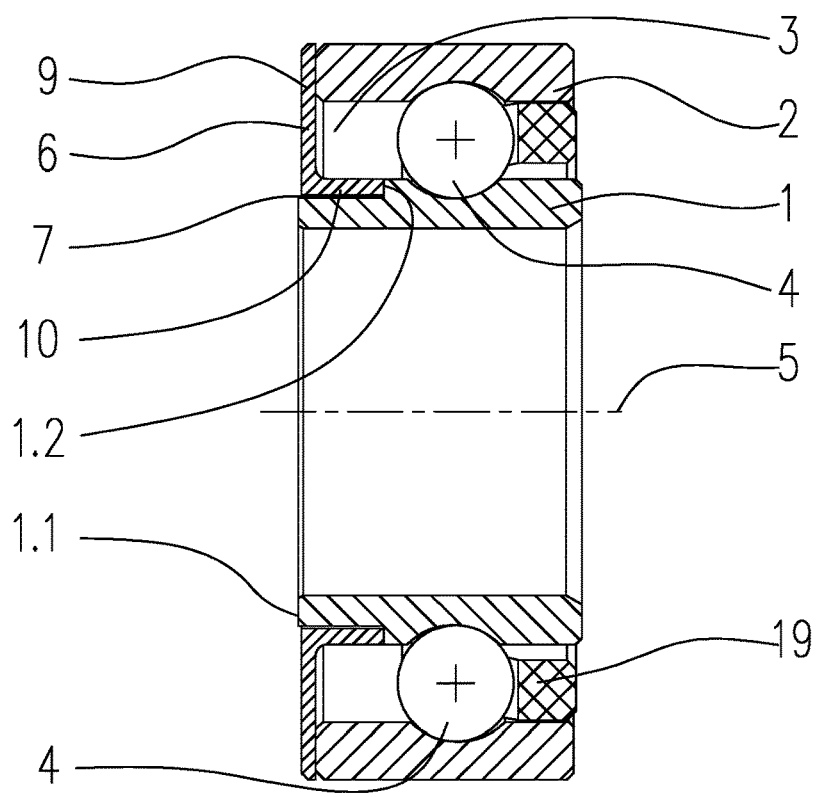
FIG. 14 shows a further exemplary embodiment of a rolling bearing according to the disclosure.

In the embodiment according to FIG. 14, the cover disk 6 frontally abuts the step 1.2 of the bearing inner ring 1 with its axial leg 10 when the rolling bearing is stationary. In operation, the contact between the cover disk 6 and the bearing inner ring 1 is canceled by a pressure difference in that the cover disk 6 elastically deforms.

Figure 15:
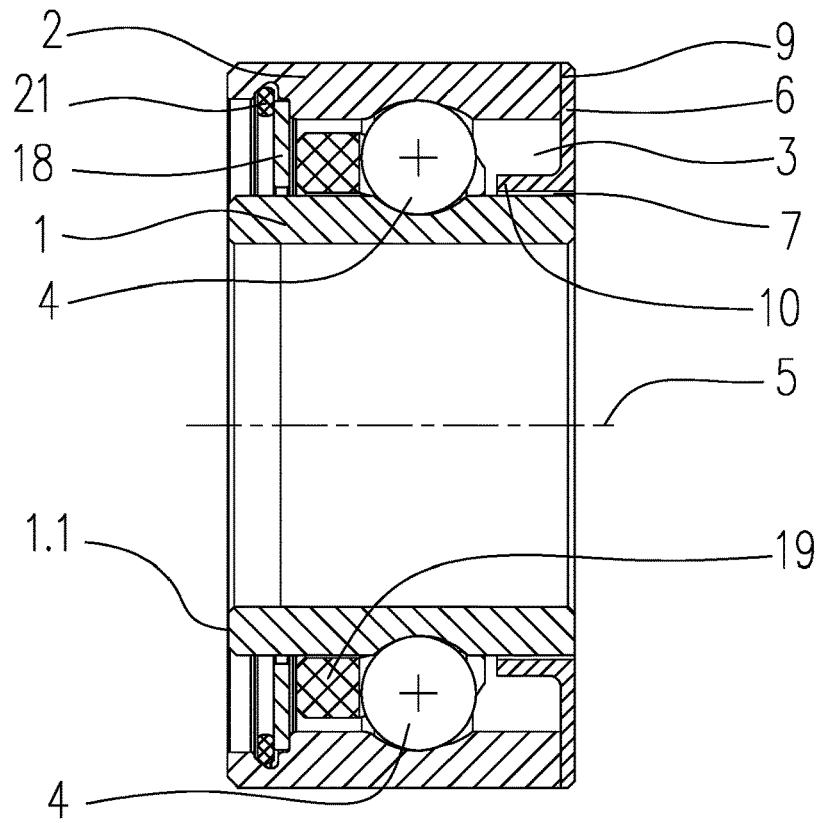
FIG. 15 shows a further exemplary embodiment of a rolling bearing according to the disclosure.

In the embodiment according to FIG. 15, the cover disk 6 is arranged at the comparatively other axial end of the rolling bearing, in comparison to the other embodiments shown. This can be the inner end of the rolling bearing 13 in FIG. 1 here. In this embodiment, an entry of air into the rolling bearing is thus reduced, so that less air can accordingly also escape at the outer end from the rolling bearing. The cover disk 6 can be embodied in different ways as described above. At the opposite end to the cover disk 6, an additional cover disk 18 is provided, which is fixed, for example, using a snap ring 21 in a recess in the bearing outer ring 2.

The rolling bearing according to FIG. 15 could, however, also be arranged in the handheld instrument from FIG. 1 in such a way, for example, that the cover disk 6 is positioned on the tool side and the additional cover disk 18 is positioned on the side facing away from the tool 16, so that accordingly the function of the two cover disks 6, 18 is reversed. In this case, the additional cover disk 18 would reduce the entry of air into the bearing gap 3 and the cover disk 6 would reduce the exit of air out of the bearing gap 3.

Figure 16:
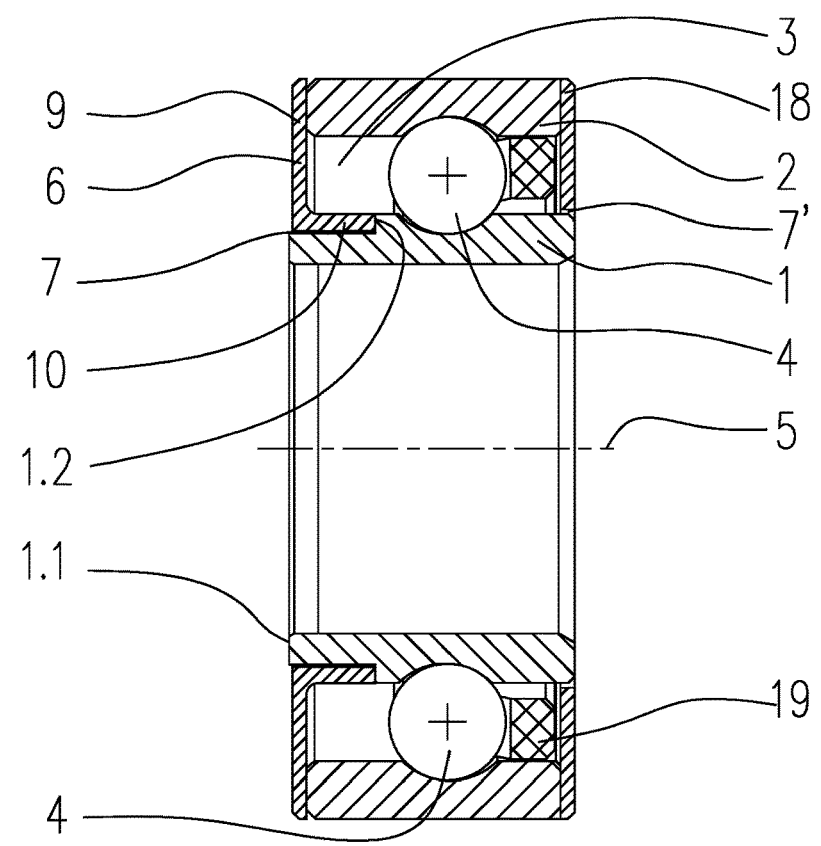
FIG. 16 shows a further exemplary embodiment of a rolling bearing according to the disclosure.

In FIG. 16, the rolling bodies 4 are again enclosed in the axial direction on both sides by the bearing inner ring 1 and by the bearing outer ring 2 to form a deep groove ball bearing. In addition to the cover disk 6, an additional cover disk 18 is again provided, which is fastened frontally on the bearing outer ring 2 here, for example, is fastened by material bonding.

Figure 17:
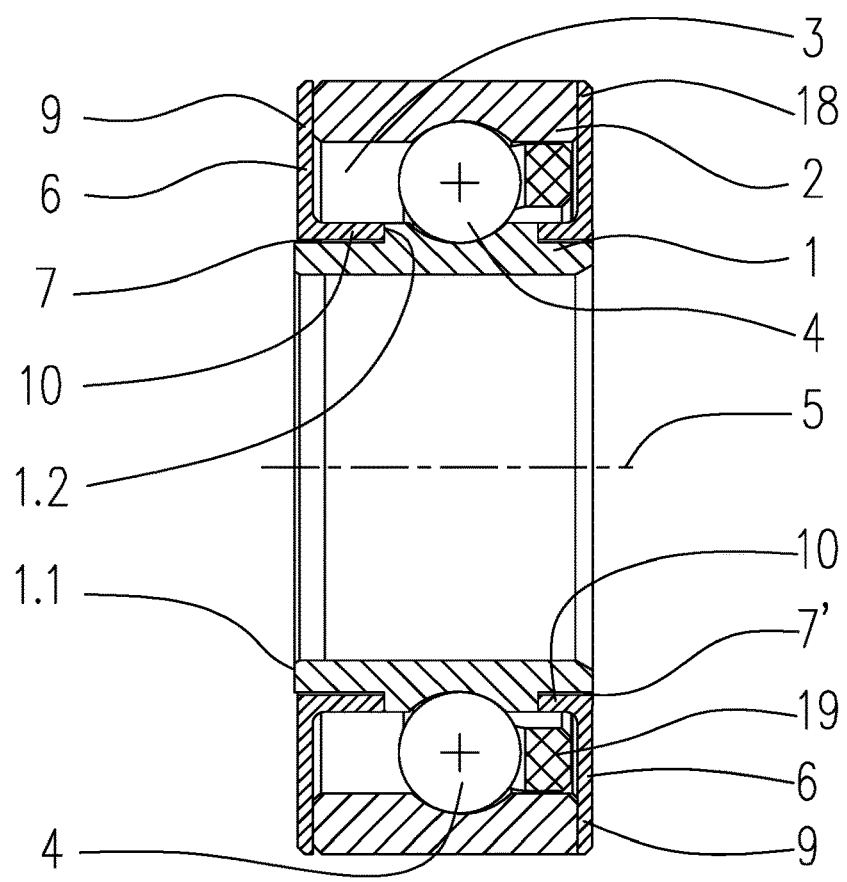
FIG. 17 shows a further exemplary embodiment of a rolling bearing according to the disclosure.

In the embodiment according to FIG. 17, not only the cover disk 6 forms a radial gap 7 having corresponding gap length, but rather the additional cover disk 18 also has an axial leg 10 to form a corresponding gap length of a radial gap 7'.

The statements made above on the cover disk 6 thus apply to the additional cover disk 18 and the design can be varied accordingly.

Figure 18:
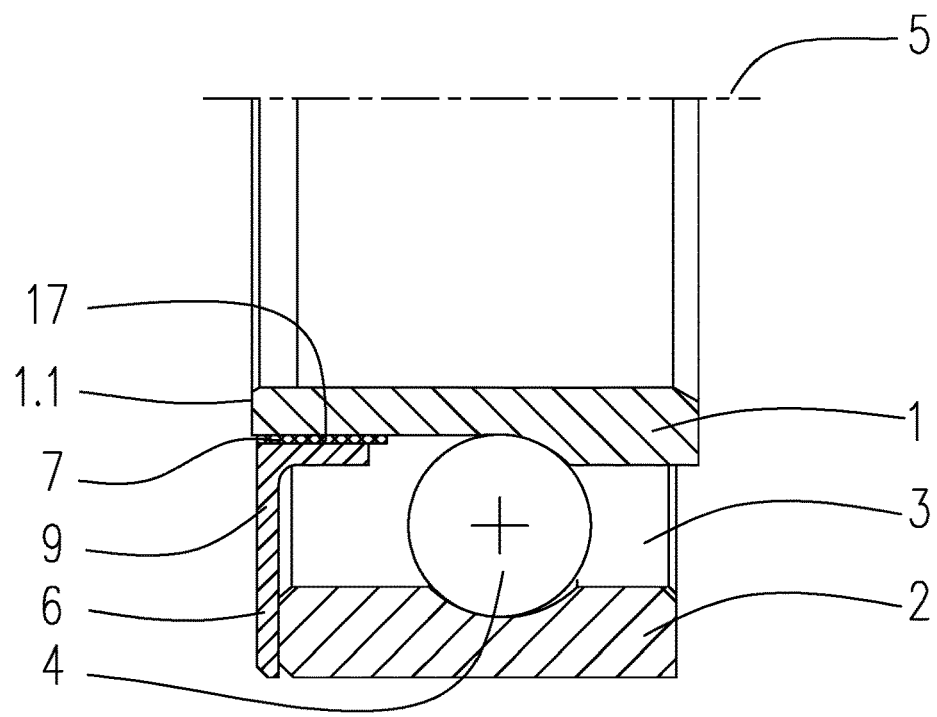
FIG. 18 shows a spacer in the radial gap to install a cover disk in the rolling bearing.

It is schematically shown in FIG. 18 that during the installation of the cover disk 6 in the rolling bearing, a spacer 17, for example in the form of a film, is applied to the radial outside on the bearing inner ring 1, the thickness of which corresponds to the radial gap 7 to be set. The cover disk 6 is placed on the bearing inner ring 1 having the spacer 17 arranged in the radial gap and is thus centered in relation to the bearing inner ring 1. The cover disk 6 is subsequently fixed in the centered state on the bearing outer ring 2 and only then is the spacer 17 removed from the radial gap 7.

Figure 19:
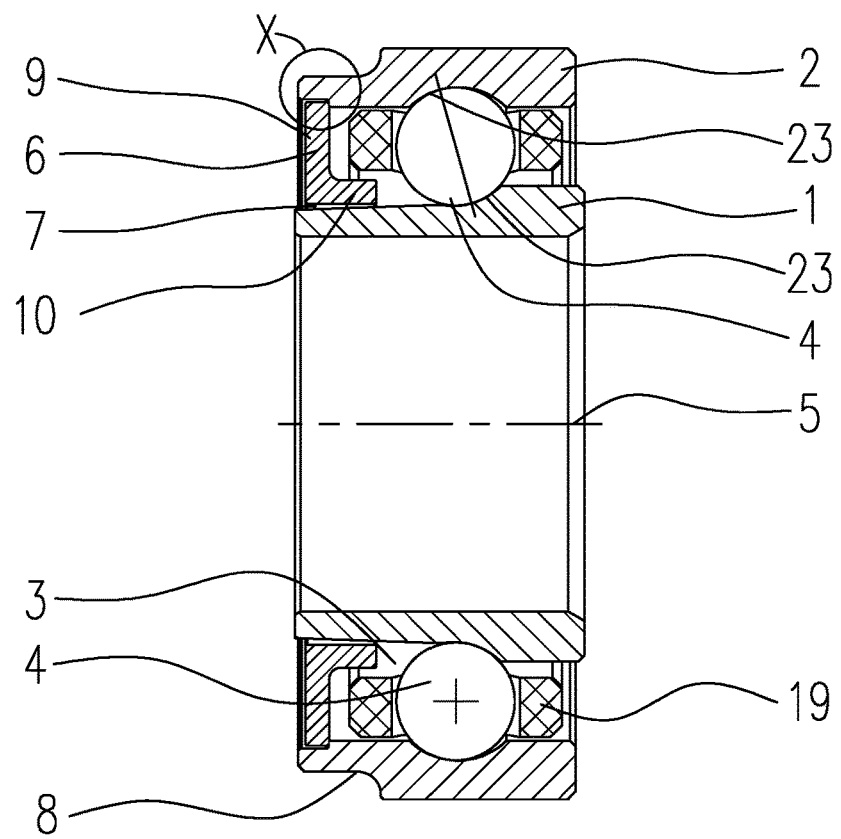
FIG. 19 shows a further exemplary embodiment of a rolling bearing according to the disclosure.
Figure 20:
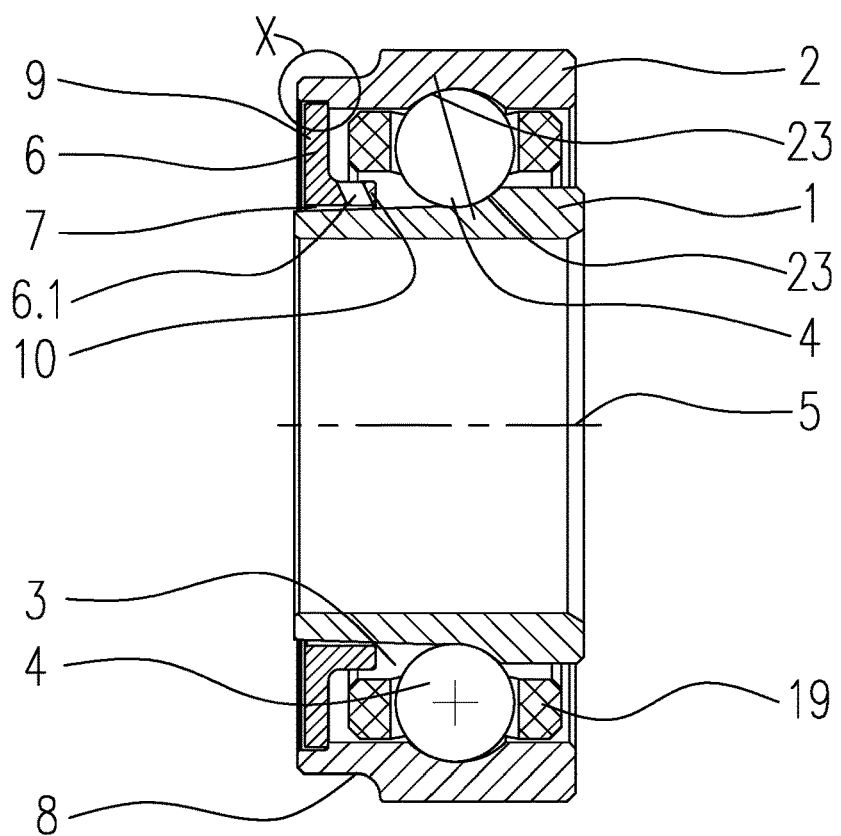
FIG. 20 shows a further exemplary embodiment of a rolling bearing according to the disclosure.
Figure 21:
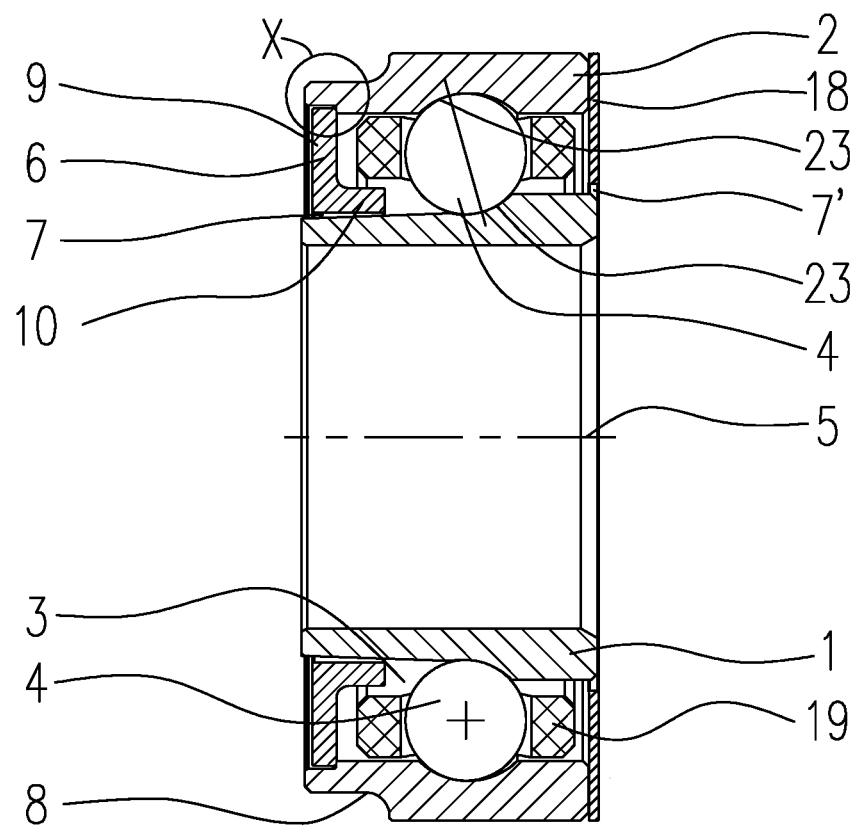
FIG. 21 shows a further exemplary embodiment of a rolling bearing according to the disclosure.
Figure 22:
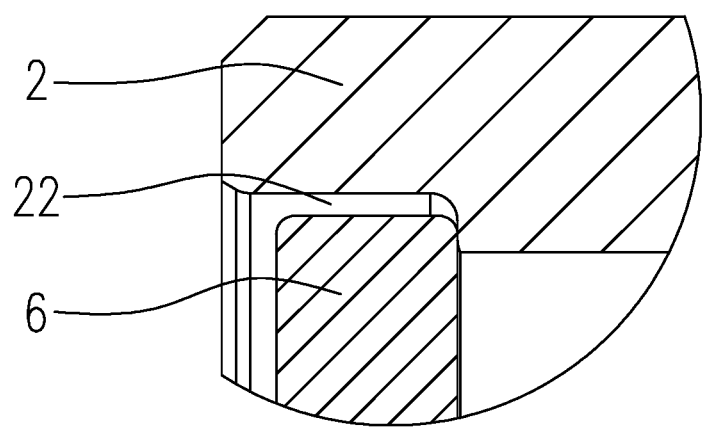
FIG. 22 shows the detail X from FIGS. 19 to 21.

In the embodiments according to FIGS. 19 to 21, the cover disk 6 is inserted radially inside into the bearing outer ring 2. The bearing outer ring 2, as can be seen in particular from the detail X, which is shown in FIG. 22, preferably has an edge-open radial groove 22 radially inside, in which the cover disk 6 is inserted.

A radial clearance can be provided between the bearing outer ring 2 and the cover disk 6, in particular inside the radial groove 22, before welding of the cover disk 6 on the bearing outer ring 2, so that the cover disk 6 can be centered in relation to the bearing inner ring 1 in order to produce a constant radial gap 7 over the circumference of the bearing inner ring 1.

In the embodiment according to FIG. 21, an additional cover disk 18, which forms a second radial gap 7' with the bearing inner ring 1, is again provided at the axial end of the bearing outer ring 2 which is opposite to the axial end having the cover disk 6. This prevents or reduces the entry of air into the rolling bearing.

In the embodiment according to FIG. 20, a bore 6.1 is again provided in the axial leg 10 of the cover disk 6, the function of which was explained above, for example, on the basis of FIG. 9.

In addition, the embodiments according to FIGS. 20 and 21 correspond to that of FIG. 19.

In the embodiments according to FIGS. 19 to 21, the cover disk 6 is preferably again embodied to be L-shaped, wherein the axial leg 10 preferably extends starting from the radial leg 9 in the direction of the rolling bodies 4. The radial gap 7 can taper here, for example, due to a slightly diagonal alignment of the radial outer surface of the bearing inner ring 1, which is opposite to the axial leg 10.

The rolling bearings are also embodied as separable ball bearings in FIGS. 19 to 21, having a shoulder 23 in the bearing outer ring 2 on the axial side of the cover disk 6 and a shoulder 23 in the bearing inner ring 1 on the axial side facing away from the cover disk 6. Furthermore, a shoulder 23 is provided in the bearing outer ring 2 on the axial side facing away from the cover disk 6. This shoulder 23 would be omitted in an embodiment of the rolling bearing as an angled ball bearing.

A diagonal force flow direction from the bearing inner ring 1 through the rolling bodies 4 onto the bearing outer ring 2 results due to the shoulders 23.

In the embodiments having cover disk 6 inserted radially inside into the bearing outer ring 2, the bearing outer ring 2 can also have a radial recess 8, in particular an edge-open radial recess 8, preferably at one axial end. A seal element and/or damping element, for example in the form of a rubber ring, advantageously an O-ring, can advantageously be accommodated therein to support the bearing outer ring 2 against a housing.

LIST OF REFERENCE SIGNS 1 bearing inner ring
1.1 end face
1.2 step
2 bearing outer ring
3 bearing gap
4 rolling body
5 axis of rotation
6 cover disk
6.1 bore
7 radial gap
7' second radial gap
8 radial recess
9 radial leg
10 axial leg
10.1 first axial section
10.2 second axial section
11 housing
12 shaft
13 rolling bearing
14 rolling bearing
15 rotor
16 tool
17 spacer
18 additional cover disk
19 cage
20 circumferential groove
21 snap ring
22 radial groove 23 shoulder
H gap height
L gap length
WH rolling body height

The invention claimed is:

1. A rolling bearing for a medical or cosmetic instrument; comprising:
a bearing inner ring revolving around an axis of rotation; and
a stationary bearing outer ring, which concentrically encloses the bearing inner ring;
wherein in the radial direction to the axis of rotation, a bearing gap is formed between the bearing inner ring and the bearing outer ring and a plurality of rolling bodies is arranged in succession in the circumferential direction in the bearing gap, via which the bearing inner ring is mounted in the bearing outer ring; and
wherein the rolling bodies are arranged rolling on the bearing inner ring and the bearing outer ring and have a rolling body height in the radial direction;
the bearing gap is covered in the axial direction by a cover disk, which is fastened on the bearing outer ring or on a housing accommodating the bearing outer ring or is integrally formed with the housing or the bearing outer ring, and which, jointly with the bearing inner ring, forms a radial gap extending in the axial direction with a gap length, in which the radial gap has a gap height in the radial direction;
characterized in that the gap length is at least 25% of the rolling body height.

2. The rolling bearing according to claim 1, characterized in that a maximum extension of the gap height is at most 20% of the rolling body height.

3. The rolling bearing according to claim 1, characterized in that the gap length is at most twice or at most three times the rolling body height.

4. The rolling bearing according to claim 1, characterized in that a minimum extension of the gap height is greater than an operating clearance between the bearing inner ring and the bearing outer ring at operating temperature of the rolling bearing.

5. The rolling bearing according to claim 1, characterized in that the cover disk is fastened frontally on the bearing outer ring.

6. The rolling bearing according to claim 5, wherein the cover disk is fastened by material bonding on the bearing outer ring.

7. The rolling bearing according to claim 1, characterized in that the cover disk encloses the bearing outer ring radially outside and is fastened on a radial outer surface of the bearing outer ring.

8. The rolling bearing according to claim 7, wherein the cover disk is inserted radially inside into the bearing outer ring, the bearing outer ring further comprising an edge-open or edge-closed radial recess.

9. The rolling bearing according to claim 1, characterized in that the cover disk, viewed in an axial section through the axis of rotation, is L-shaped on both sides of the axis of rotation having a radial leg arranged on the bearing outer ring and an axial leg forming the radial gap.

10. The rolling bearing according to claim 9, characterized in that the axial leg extends exclusively in the direction of the rolling bodies starting from the radial leg.

11. The rolling bearing according to claim 1, characterized in that the cover disk, viewed in an axial section through the axis of rotation, is T-shaped on both sides of the axis of rotation having a radial leg arranged on the bearing outer ring and an axial leg forming the radial gap.

12. The rolling bearing according to claim 1, characterized in that the cover disk, viewed in an axial section through the axis of rotation, on both sides of the axis of rotation, has in each case a radial leg extending in the radial direction and arranged on the bearing outer ring and an axial leg extending in steps in the axial direction and forming the radial gap in steps.

13. The rolling bearing according to claim 12, characterized in that the axial leg has a first axial section, which forms a section of the radial gap together with a shaft mounted in the bearing inner ring, and a second axial section, which forms a section of the radial gap together with the bearing inner ring, wherein the two axial sections of the radial gap are offset to one another in the radial direction.

14. The rolling bearing according to claim 1, characterized in that the cover disk has a bore extending in the radial direction or diagonally to the axial direction or a plurality of bores arranged in succession in the circumferential direction and extending in the radial direction or diagonally to the axial direction, which open inside the gap length in the radial gap.

15. The rolling bearing according to claim 1, characterized in that the gap length is at least 50% of the rolling body height.

16. The rolling bearing according to claim 1, characterized in that the rolling bodies are ball-shaped and the rolling body height corresponds to the external diameter of the rolling bodies.

17. The rolling bearing according to claim 1, characterized in that the gap height is constant over the gap length.

18. The rolling bearing according to claim 1, characterized in that the gap height varies over the gap length.

19. The rolling bearing according to claim 18, characterized in that the gap height decreases over the gap length in a direction from the axial outer end of the cover disk to the rolling bodies.

20. The rolling bearing according to claim 19, wherein the gap height decreases linearly over the gap length in a direction from the axial outer end of the cover disk to the rolling bodies when viewed in an axial section through the axis of rotation.

21. The rolling bearing according to claim 1, characterized in that the cover disk is elastically deformable in the axial direction at least in the region of an end of the cover disk assigned to the bearing inner ring.

22. The rolling bearing according to claim 21, characterized in that the cover disk, when the rolling bearing is at a standstill, presses against a step or end face of the bearing inner ring and, when the bearing inner ring is revolving, is raised off of the step or the end face by a differential pressure over the cover disk.

23. The rolling bearing according to claim 1, characterized in that the cover disk and/or the bearing inner ring has a conveyance contour adjoining the radial gap, which effectuates an air conveyance of air located in the radial gap in the direction of the rolling bodies.

* * * * *